Jan. 8, 1924. 1,480,303
I. ROY
MILITARY VEHICLE
Original Filed June 28, 1920  2 Sheets-Sheet 1
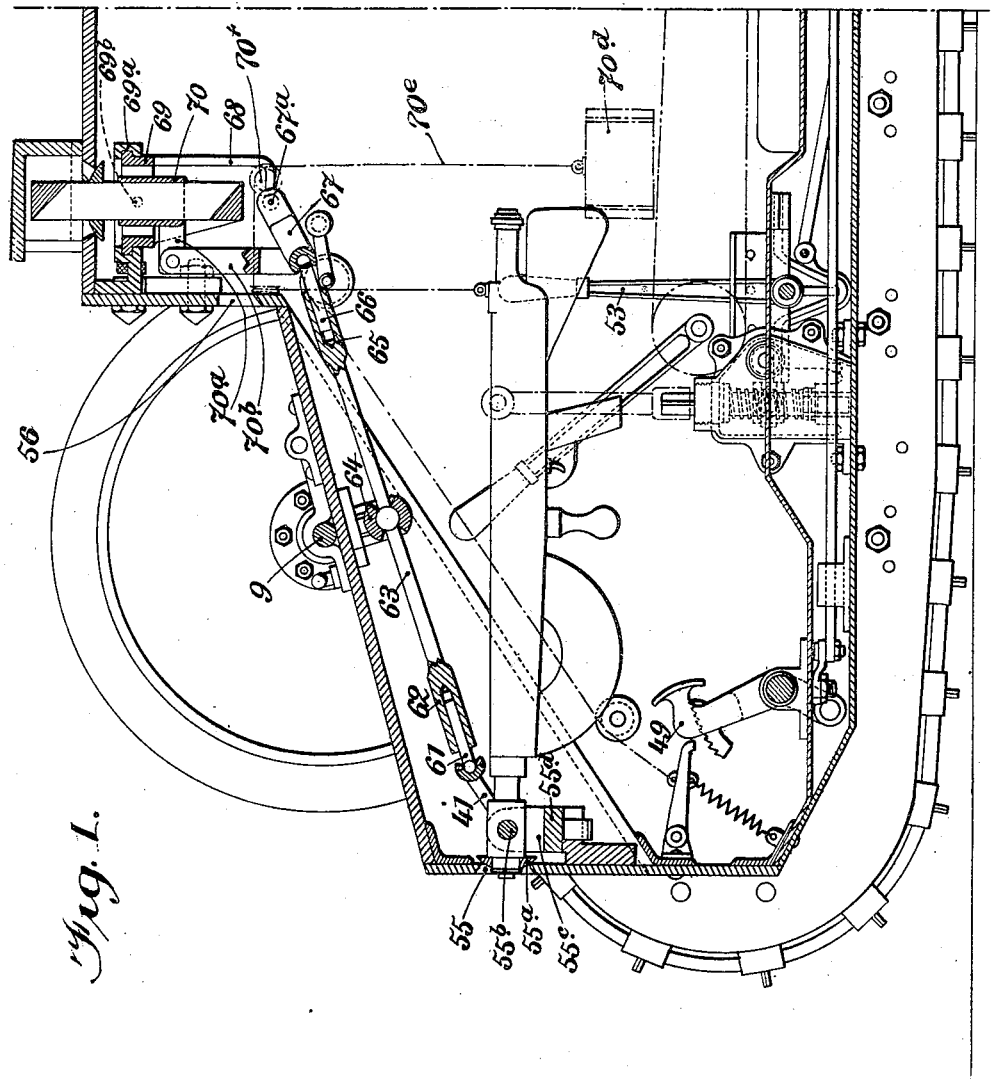
Inventor
Iréné Roy
by H.O.Willson
Attorneys

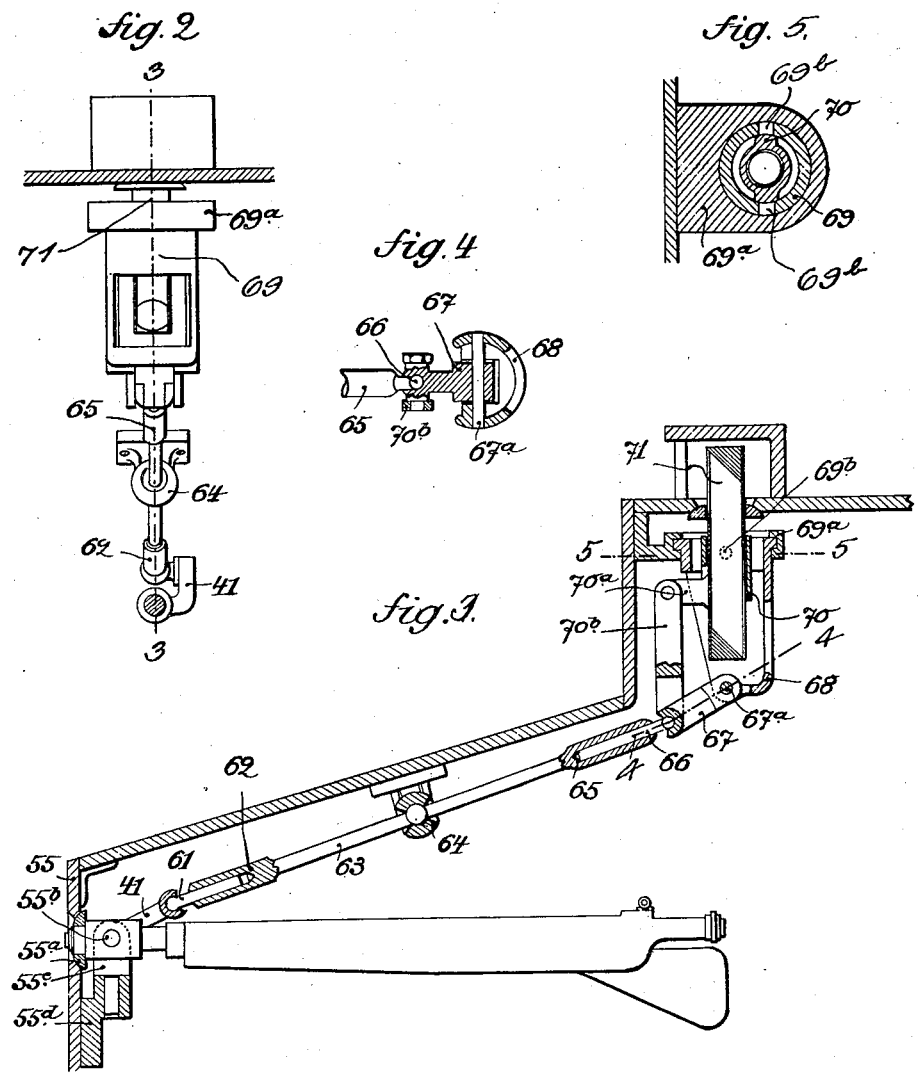

Patented Jan. 8, 1924.

1,480,303

UNITED STATES PATENT OFFICE.

IRÉNÉ ROY, OF PARIS, FRANCE.

MILITARY VEHICLE.

Original application filed June 28, 1920, Serial No. 392,308. Divided and this application filed July 14, 1921. Serial No. 484,754.

*To all whom it may concern:*

Be it known that I, IRÉNÉ ROY, a citizen of the Republic of France, and residing at Paris, Seine Department, No. 12 Rue de la Rochefoucauld, in the Republic of France, have invented certain new and useful Improvements in Military Vehicles, of which the following is a specification.

This invention relates to armoured cars, provided with a machine gun, or automatic rifle, and more particularly to those of the type described in the copending application No. 392,308, filed June 28, 1920, and of which this application is a division.

The object of the invention is to provide means whereby the steering of the vehicle or the correct sighting or aiming of the machine gun or automatic rifle, may be effected whilst the driver remains completely protected.

To this end, in the front part of the compartment is disposed a recess containing an aiming bearing for a machine gun, while a periscope disposed in the upper part is mechanically connected with the said machine gun whereby the latter can be aimed or sighted and the vehicle steered during the combat. The firing ammunition is placed near at hand so as to be readily brought into use.

In the accompanying drawings which illustrate by way of example one embodiment of the invention, Fig. 1 is a longitudinal vertical section of the front portion of the vehicle. Fig. 2 is a fragmentary view showing a portion of the mechanism in elevation. Fig. 3 is a sectional view taken along the line 3—3 of Fig. 2. Fig. 4 is a transverse sectional view taken along the line 4—4 of Fig. 3. Fig. 5 is a transverse sectional view taken along the line 5—5 of Fig. 3.

The end of the automatic gun is placed opposite an opening 55, and is provided with a spherical part 55ᵃ adapted to close the said opening in all positions of the gun.

The said end is pivoted in a bracket 55ᶜ by means of a horizontal axle 55ᵇ, the said bracket being capable of pivoting on a support 55ᵈ fixed to the vehicle body.

An arm 41 is fixed to the barrel of the rifle, the said arm being connected, through the intermediary of a ball and socket joint, with a rod 61, sliding in a socket 62. The latter socket is an extension of a lever 63 articulated at 64 on to the vehicle body by means of a ball and socket joint, and carries at its other end a socket 65, in which slides a rod 66, articulated to a lever 67, by means of a ball and socket joint.

The said lever 67 may pivot around an horizontal axis 67ᵃ, integral with the arm 68 depending from the ring 69, which may rotate in the support 69ᵃ fixed to the vehicle body.

The ring 69 carries by means of two trunnions 69ᵇ a ring 70 integral with the periscope 71, and the said ring is integral with an extension 70ᵃ on which is articulated a connecting rod 70ᵇ articulated to the lever 67.

The said periscope may rotate around a vertical axis which is that of the ring 69, and at the same time may pivot around a horizontal axis constituted by the trunnions 69ᵇ.

In order to facilitate operation, the weight of the gun is preferably balanced by a counter-weight 70ᵈ to which it is connected by means of a cable 70ᵉ passing over guiding pulleys 70ᶠ.

Under these conditions, the movements of the rifle control those of the periscope in the following manner:—

Supposing the gun stock to be brought from the operators right to the central position, the coupler 62 will make a similar movement, and in consequence the coupler 65 will be moved in the opposite direction, carrying with it the rod 66, and the ring 69 through the intermediary of lever 67, will be rotated in a clockwise direction, looking downward thereon, whereby the line of sight of the rifle will be kept parallel to the line of the periscope.

In like manner, when aiming in elevation, should the gun be inclined, the lever 67 pivots round the axis 67ᵃ and its movement is transmitted to the ring 70 through the connecting rod 70ᵇ whereby the pivoting of the periscope around the trunnion 69ᵇ is caused.

In order to facilitate the sighting operation, it is advisable to draw upon the upper prism two black lines forming a cross.

Claims:

1. In a motor vehicle, the combination of an armoured vehicle body, a gun mounted for horizontal and vertical swinging movement, a periscope, a pivoted support for the said periscope, including two journaled shafts perpendicular to each other, and driving means for transmitting the gun movements to the periscope, these means comprising a rod having its ends in the form of coupling portions, a ball and socket support secured to the vehicle body and having the said rod mounted therein, an arm rigidly secured to the machine gun, a shaft pivoted on this arm and slidable in one of the coupler ends of the said rod, a second arm rigidly secured to the base of the periscope, and a shaft pivoted on this second arm and slidable in the other coupler end of the said rod.

2. In a motor vehicle, the combination of an armoured body, a gun adapted to be pointed by hand and mounted for universal movement, a periscope, a pivoted support for the said periscope adapted to allow horizontal turning and vertical tilting movement, and an articulated system formed of rigid rods connecting the gun with the periscope and adapted to maintain the periscope in the direction of firing.

3. In a motor vehicle, the combination of an armoured body, a gun adapted to be pointed directly by hand and mounted for universal movement, a periscope, a pivoted support for the said periscope, said support comprising two axes of revolution at right angles the one to the other, and transmission means through which the displacements or shifting motions of the gun are transmitted to the periscope, these means comprising a rod the ends of which are in the form of coupling portions, a support for said rod carried by said body and having universal or ball and socket joint connection with the rod, an arm rigidly connected with the gun, an axis pivoted to this arm and sliding in one of the coupling portions of the said rod, another arm rigidly connected with the periscope support and an axis pivoted to this other arm and sliding in the other coupling portion of said rod.

In testimony that I claim the foregoing as my invention I have signed my name in presence of a subscribing witness.

IRÉNÉ ROY.

Witness:
    MAURICE ROUX.